(12) United States Patent
Kim

(10) Patent No.: US 9,252,604 B2
(45) Date of Patent: Feb. 2, 2016

(54) APPARATUS FOR WIRELESS POWER TRANSMISSION AND RECEPTION

(75) Inventor: Sang Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1100 days.

(21) Appl. No.: 13/182,342

(22) Filed: Jul. 13, 2011

(65) Prior Publication Data

US 2012/0062203 A1 Mar. 15, 2012

(30) Foreign Application Priority Data

Sep. 15, 2010 (KR) ........................ 10-2010-0090810

(51) Int. Cl.
 *H01F 27/42* (2006.01)
 *H02J 7/00* (2006.01)
 *H02J 17/00* (2006.01)
 *H02J 7/02* (2006.01)

(52) U.S. Cl.
 CPC ............... *H02J 7/0024* (2013.01); *H02J 7/025* (2013.01); *H02J 17/00* (2013.01)

(58) Field of Classification Search
 CPC ........... H02J 5/005; H02J 7/025; H02J 17/00; H04B 5/0037
 USPC ........................................................ 307/104
 See application file for complete search history.

(56) References Cited

U.S. PATENT DOCUMENTS

| | | | |
|---|---|---|---|
| 8,461,817 B2 * | 6/2013 | Martin et al. | 323/282 |
| 8,644,933 B2 * | 2/2014 | Ozawa et al. | 607/29 |
| 2009/0228077 A1 * | 9/2009 | Ginggen et al. | 607/61 |
| 2009/0308933 A1 | 12/2009 | Osada | |
| 2010/0109443 A1 | 5/2010 | Cook et al. | |
| 2010/0148723 A1 | 6/2010 | Cook et al. | |
| 2011/0074343 A1 * | 3/2011 | Chen | 320/108 |
| 2012/0056486 A1 * | 3/2012 | Endo et al. | 307/104 |
| 2012/0139358 A1 * | 6/2012 | Teggatz et al. | 307/104 |
| 2012/0248890 A1 * | 10/2012 | Fukushima | 307/104 |

FOREIGN PATENT DOCUMENTS

| | | |
|---|---|---|
| CN | 1290427 A | 4/2001 |
| CN | 101557032 A | 10/2009 |
| CN | 101809687 A | 8/2010 |
| JP | 58-14224 A | 1/1983 |
| JP | 59-169592 U | 11/1984 |

(Continued)

OTHER PUBLICATIONS

International Search Report, mailed Apr. 4, 2012, issued in counterpart International Patent Application No. PCT/KR2011/005764; 3 pages.

(Continued)

*Primary Examiner* — Daniel Cavallari
(74) *Attorney, Agent, or Firm* — NSIP Law

(57) ABSTRACT

Provided is a wireless power transmission system to increase efficiency in wireless power transmission. A wireless power transmitter may include: one or more capacitors; a power inputting unit configured to receive power from a power supply and to charge the one or more capacitors; a transmitting unit configured to transmit resonance power; and a switching unit configured to control electrical connection of the one or more capacitors to the power inputting unit and to the transmitting unit. A wireless power receiver is also described.

26 Claims, 10 Drawing Sheets

(56) References Cited

FOREIGN PATENT DOCUMENTS

| | | |
|---|---|---|
| JP | 61-161967 A | 7/1986 |
| JP | 10-215564 A | 8/1998 |
| JP | 10-313260 A | 11/1998 |
| JP | 2007-60809 A | 3/2007 |
| JP | 2008-029200 | 2/2008 |
| JP | 2008-71129 A | 3/2008 |
| JP | 2008-104295 | 5/2008 |
| JP | 2009-124878 | 6/2009 |
| JP | 2009-189229 | 8/2009 |
| JP | 2010-011654 | 1/2010 |
| JP | 2010-088143 | 4/2010 |
| JP | 2010-161882 A | 7/2010 |
| KR | 10-2007-0017804 | 3/2007 |
| KR | 10-2009-0131748 | 12/2009 |

OTHER PUBLICATIONS

Chinese Office Action issued on Dec. 10, 2014, in counterpart Chinese Application No. 20118004592.1 (15 pages in Chinese, 24 pages in English).

Japanese Office Action issued on Feb. 24, 2015, in counterpart Japanese Application No. 2013-529044 (8 pages in English, 8 pages in Japanese).

* cited by examiner

APPARATUS FOR WIRELESS POWER TRANSMISSION AND RECEPTION

CROSS-REFERENCE TO RELATED APPLICATION(S)

This application claims the benefit under 35 U.S.C. §119(a) of Korean Patent Application No. 10-2010-0090810, filed on Sep. 15, 2010, in the Korean Intellectual Property Office, the entire disclosure of which is incorporated herein by reference for all purposes.

BACKGROUND

1. Field

The following description relates to wireless power transmission.

2. Description of Related Art

As use of portable electric devices have increased, so has the inconvenience of having a wired power supply. To overcome the inconvenience of having a wired power supply and the limited capacity of conventional batteries, research on short-distance wireless power transmission has been conducted. Short-distance wireless power transmission may generate a magnetic field using a transmission coil in a given operating frequency, and may transmit the energy stored in the generated magnetic field by generating an induction current in a reception coil. Wireless power transmission schemes may use a characteristic of resonance of radio frequency (RF) devices. One wireless power transmission system based on the characteristic of resonance may include a source that supplies power and a target that receives power.

SUMMARY

According to an aspect, a wireless power transmitter may include: one or more capacitors; a power inputting unit configured to receive power from a power supply and to charge the one or more capacitors; a transmitting unit configured to transmit resonance power; and a switching unit configured to control electrical connection of the one or more capacitors to the power inputting unit and to the transmitting unit.

The power inputting unit may be configured to receive power inputted from a DC power supply or an AC power supply to charge the capacitors.

The switching unit may be configured to control the electrical connection such that none of the one or more capacitors is electrically connected to both the power inputting unit and the transmitting unit simultaneously.

The switching unit may include one or more switches corresponding to the one or more capacitors, respectively, and the one or more switches control the electrical connection of the one or more capacitors between the power inputting unit and the transmitting unit.

The wireless power transmitter may further include a controller configured to control a charge time during which the one or more capacitors are electrically connected to the power inputting unit, a transmission time during which the one or more capacitors are electrically connected to the transmitting unit, or both, by sensing power stored in the one or more capacitors.

The controller may be configured to control the transmission time such that the one or more capacitors are discharged to a level less than a predetermined value.

The controller may be configured to control the charge time such that the one or more capacitors are charged to a level greater than or equal to a predetermined level.

The switching unit may be configured to selectively (i) charge the one or more capacitors, and (ii) discharge power from the charged one or more capacitors to the transmitting unit.

According to an aspect, a wireless power receiver may include: one or more capacitors; a receiving unit configured to receive resonance power and to charge the one or more capacitors; a power outputting unit configured to transmit power to a target device; and a switching unit configured to control electrical connection of the one or more capacitors to the receiving unit and to the power outputting unit.

The switching unit may be configured to control the electrical connection such that none or the one or more capacitors are electrically connected to the receiving unit and the power outputting unit simultaneously.

The target device may comprise a battery.

The wireless power receiver may further include: a controller configured to control a charge time during which the one or more capacitors are electrically connected to the receiving unit, a transmission time during which the one or more capacitors are electrically connected to the power outputting unit, or both, by sensing power stored in the one or more capacitors.

There may be a waiting time between the charge time and the transmission time.

The controller may be configured to control the charge time such that the one or more capacitors are charged to a level greater than or equal to a predetermined level.

The controller may be configured to control the transmission time such that the one or more capacitors are discharged to a level less than a predetermined value.

The switching unit may be configured to selectively (i) charge the one or more capacitors, and (ii) discharge power from the charged one or more capacitors to the power outputting unit.

According to an aspect, a wireless power transmission system may include: a power inputting unit configured to receive power from a power supply and to charge one or more first capacitors; a transmitting unit configured to transmit resonance power; a first switching unit configured to control electrical connection of the one or more first capacitors to the power inputting unit and to the transmitting unit; a receiving unit configured to receive resonance power to charge one or more second capacitors; a power outputting unit configured to transmit power to a target device; and a second switching unit configured to control electrical connection of the one or more second capacitors to the receiving unit and to the power outputting unit.

The first switching unit is configured to control the electrical connection such that none of the one or more first capacitors is electrically connected to both the power inputting unit and the transmitting unit simultaneously; and the second switching unit may be configured to control the electrical connection such that none of the one or more second capacitors is electrically connected to both the receiving unit and the power outputting unit simultaneously.

The first switching unit and the second switching unit may be asynchronous, and configured to control the electrical connection of the one or more first capacitors to the power inputting unit, and to the transmitting unit and the electrical connection of the one or more second capacitors to the receiving unit and to the power outputting unit, respectively.

According to an aspect, a wireless power transmitter may include: one or more capacitors; a power source connectable to the one or more capacitors for a first period to charge the one or more capacitors; and a circuit connectable to the one or more capacitors for a second period to transmit resonance power.

The first period may not overlap with the second period. The first and second periods may be fixed or may be variable.

The power source may include an AC power source.

The one or more capacitors may be arranged in parallel.

According to an aspect, a portion of a wireless power receiver may include: one or more capacitors; a wireless power reception circuit electrically connectable to the one or more capacitors to form a resonance circuit and to charge the one or more capacitors; and a load electrically separate from the portion of the wireless power reception circuit and electrically connectable to the one or more capacitors when the one or more capacitors are not electrically connected to the portion of the wireless power reception circuit.

The load may comprise a battery.

The one or more capacitors are arranged in parallel.

The one or more capacitors are electrically connectable to the portion of the wireless power reception circuit for a first period and are connectable to the load for a second period.

The first and second periods may be fixed or variable. The first period may be different from the second period.

According to an aspect, a wireless power transmission system may include: a power source electrically connectable to one or more first capacitors for a first period to charge the first capacitors; a portion of a wireless power transmission circuit electrically separate from the power source and electrically connectable to the one or more first capacitors for a second period to form a resonance circuit; a portion of a wireless power reception circuit electrically connectable to one or more second capacitors to form a resonance circuit and to charge the one or more second capacitors; and a load electrically separate from the portion of the wireless power reception circuit and electrically connectable to the one or more second capacitors when the one or more second capacitors are not electrically connected to the portion of the wireless power reception circuit.

The first period may not overlap with the second period.

Other features and aspects will be apparent from the following detailed description, the drawings, and the claims.

Figure 1:
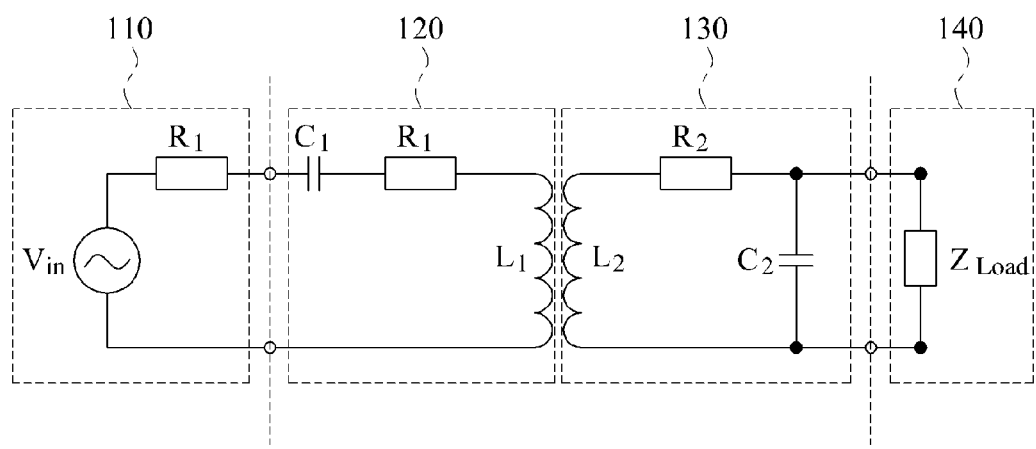
FIG. 1 is a diagram illustrating an equivalent circuit of a conventional short-distance wireless power transmission system.

Throughout the drawings and the detailed description, unless otherwise described, the same drawing reference numerals should be understood to refer to the same or like elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Wireless power transmission may be applicable to various systems. Examples of such systems may include, for instance, a wireless charger of a cell phone, a wireless television (TV), or the like. Wireless power transmission may also be applicable to the bio/health care field. In particular wireless power transmission may be used to transmit power to a device inserted into or positioned proximate to the human body. For example, a heart-rate measuring device may be configured as a type of a bandage without a wired connection.

In one embodiment, wireless power transmission may be utilized for remote control of an information storage device that does not include a power source. And in another embodiment, wireless power transmission may be applicable to a system that remotely supplies power to the information storage device and wirelessly reads information stored in it.

FIG. 1 illustrates an equivalent circuit of a conventional short-distance wireless power transmission system.

Here, the wireless power transmitted using the wireless power transmission system shown in FIG. 1 may be assumed to be resonance power.

As shown in FIG. 1, the wireless power transmission system may include a source and a target. The wireless power transmission system may include a wireless power transmitter corresponding to the source and a wireless power receiver corresponding to the target. For example, the wireless power transmitter may include a source unit 110 and a source resonator 120. The source unit 110 may be configured to receive energy from a power supply or may include a power source to generate resonance power. The source resonator 120 may be configured to transmit electromagnetic energy to a target resonator 130. In particular, the source resonator 120 may be configured to transmit the resonance power through magnetic coupling with the target resonator 130. The source unit 110 may be modeled to include a power source $V_{in}$ and an internal resistance $R_{in}$, and the source resonator 120 may be modeled to include circuit elements, resistor $R_1$, inductor $L_1$, and capacitor $C_1$, based on corresponding physical characteristics.

The wireless power receiver may include the target resonator 130 and a target unit 140. The target resonator 130 may receive the electromagnetic energy from the source resonator 120. The target resonator 130 may be configured to receive the resonance power through magnetic coupling with the source resonator 130. The target unit 140 may be configured to transmit the received resonance power to a load or may include a load. The target resonator 130 may be modeled to include circuit elements, resistor $R_2$, inductor $L_2$, and capacitor $C_2$, and the target unit may be modeled as a target $Z_{Load}$.

As shown in FIG. 1, the source unit 110 is connected to the source resonator 120 and the target resonator 130 is connected to the target unit 140. To improve efficiency, wireless power transmission system may be performed as follows.

First, operating frequencies between the source resonator 120 and the target resonator 130 may be matched based on a distance between them. A frequency that maximizes the transmission efficiency may vary based on the distance between the source resonator 120 and the target resonator 130. Therefore, the operating frequency may be adjusted as the distance between the source resonator 120 and the target resonator varies.

Second, an impedance matching may be performed in both the wireless power transmitter and the wireless power receiver. The impedance matching may be performed to maximize the power transmitted to the source resonator 120 from a power source and to maximize the power transmitted to a target from the target resonator 130. On the other hand, when the impedance is mismatched, resonance power may become reflected and the transmission efficiency may decrease. The impedance matching may be performed based on characteristics of the source resonator 120 and the target resonator 130, an impedance of the target, and a characteristic of a channel to which the resonance power between the source resonator 120 and the target resonator 130 is to be transmitted (for example, a distance, a transmission medium, and/or the like).

Third, a transmission amplifier may be used in the wireless power transmitter, and a rectifier may be used in the wireless power receiver. Therefore, efficiency of the power amplifier and the rectifier may need to be increased to improve the transmission efficiency.

Thus, the wireless power transmission system of FIG. 1 may be configured to match the frequencies and perform the impedance matching based on a change in operation environment, such as a change in the distance between resonators and a change of the target, and may use an efficient power amplifier and an efficient rectifier, to improve the transmission efficiency.

Figure 2:
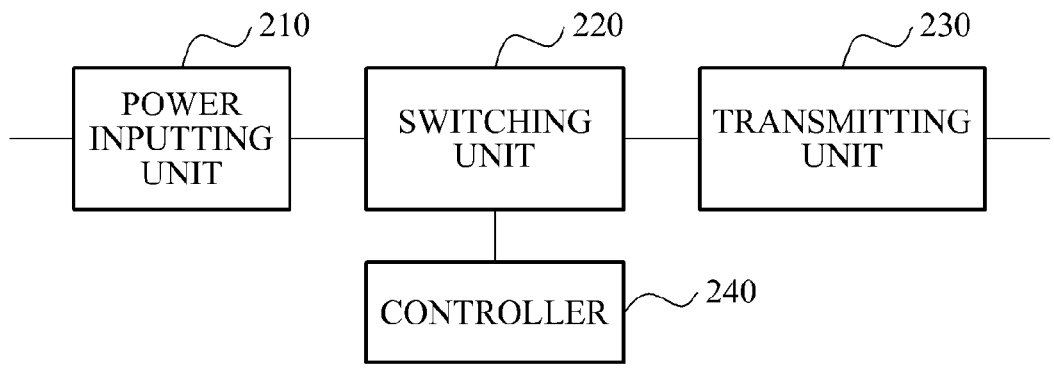
FIG. 2 is a block diagram illustrating a wireless power transmitter.

FIG. 2 illustrates a wireless power transmitter according to one or more embodiments disclosed herein.

As shown in FIG. 2, the wireless power transmitter may include a power inputting unit 210, a switching unit 220, a transmitting unit 230, and a controller 240.

The power inputting unit 210 may be configured to receive power from a power supply, or may include a power source, to charge one or more capacitors. If multiple capacitors are used they may be arranged in a parallel manner, for instance. Although, it will be appreciated that the capacitors can also be arranged in a serial manner, or even in a combination parallel and serial arrangement.

The power inputting unit 210 may be configured to receive power inputted from, or may include a DC power supply or an AC power supply, to charge one or more capacitors. The power inputting unit 210 may be configured to directly charge the capacitor(s) using the DC power supply, for instance. When the AC power supply is used, the power inputting unit 210 may be configured to convert the AC power to the DC power using an AC/DC converter, or may add a switch and adjust a proper time to activate the switch to charge the capacitor(s).

The switching unit 220 may include one or more switches (or switching elements) corresponding to one or more capacitors, respectively and be configured to individually control the switch for each capacitor. The switches or switch elements may include various electromechanical switches (e.g., contact, toggle, knife, tilt, or the like) or electrical switches (e.g., solenoid, relays, or solid-state elements such as a transistor switch, silicon-controlled rectifier or a triac). Of course, other types of switches are also possible. In various embodiments, the switch may be configured to select between ON and OFF positions, which permit and prevent the flow of electricity (power), respectively. Accordingly the switches control electrical connection to and/or from one or more capacitors, thus enabling charging and discharging thereof. For instance, the switching unit may be configured, for example, to selectively (i) charge the one or more capacitors, and (ii) discharge power from the charged one or more capacitors. The switching unit may be controlled by a controller.

In one embodiment of the wireless power transmitter, the switching unit 220 may be configured to control electrical connection of one or more capacitors to the power inputting unit 210 and/or to the transmitting unit 230. For example, in response to controller 240, the switching unit 220 may be configured to selectably switch electrical connection of one or more capacitors between the power inputting unit 210 and to the transmitting unit 230.

Switching may be based, for example, on a charge time for charging the capacitors and/or a transmission time for transmitting power stored in the capacitors to a source resonator. During the charge time for charging one or more capacitors, the switching unit 220 may connect the capacitor to the power inputting unit 210. One or more capacitors may be connected to the power inputting unit 210 by an ON/OFF operation of one or more switches, for instance. The capacitor(s) may be separated from the transmitting unit 230 while it is connected to the power inputting unit 210. Therefore, the power inputting unit 210 and the transmitting unit 230 may be electrically separated (or isolated) from each other by a switching operation of the switching unit 220.

A process transmitting the power stored in the capacitors to the source resonator may be performed by electrically connecting one or more charged capacitors to the source resonator. During the transmission time, the switching unit 220 may connect one or more charged capacitors to the transmitting unit 230. The one or more charged capacitors may be electrically connected only to the transmitting unit 230 and thus, the power inputting unit 210 may be electrically separated and isolated from the transmitting unit 230.

The switching unit 220 may be configured to selectively connect one or more of the capacitors to the power inputting unit 210 or the transmitting unit 230. In some implementations, a capacitor charged to a level greater than or equal to a predetermined level may be connected to the transmitting unit 230, and a capacitor charged to a level less than the predetermined level may be connected to the power inputting unit 210. In embodiments, typically no capacitor will be simultaneously connected to both the inputting unit 210 and the transmitting unit 230. Although, this may not always be the case. The switching unit 220 may connect a capacitor to the transmitting unit 230 for a predetermined time after it is connected to the power inputting unit 210. And the switching unit 220 may control the switches to alternate the charge time and the transmission time.

The charge time may be determined based on a charging capability of the power supply, for instance. If the power supply has a fast charging capability, the charge time may be short. The transmission time may be determined based on a degree of discharge of the power stored in the capacitor due to resonance power transmission. The transmission time, which also indicates a discharge time, may be determined based on a rate of discharge of the power stored in the capacitor.

The switching unit 220 may be configured to control the switches to prevent the charge time and the transmission time from overlapping with each other, with respect to each capacitor. This is because when the charge time and the transmission time overlap with each other, the power inputting unit 210 and the transmitting unit 230 may be physically and electrically connected to each other. And when the power inputting unit 210 and the transmitting unit 230 are physically and electrically connected to each other, a factor deteriorating performance, such as impedance mismatching and/or the like, may be generated.

The transmitting unit 230 may be configured to transmit resonance power to a target resonator. In some embodiments, resonance power may be transmitted through a magnetic coupling, for instance. Other resonance power transmission methods are also possible. When the charged capacitor is electrically connected to the source resonator through the switching unit 220, the transmitting unit 230 may transmit for example, through the magnetic coupling, power stored in the charged capacitor.

The controller 240 may be configured to sense the power stored in one or more of the capacitors and may control the charge time and the transmission time of one or more of the capacitors. For example, the controller 240 may sense the power stored in the multiple capacitors connected to the power inputting unit 210. When the multiple capacitors are charged to a level greater than or equal to a predetermined level, they may be connected to the transmitting unit 230. The predetermined level may be set to a maximum charging level of a capacitor or the predetermined level may be set to a value determined based on a stability of the capacitor. Accordingly, the controller 240 may be configured to sense the power stored in one or more of the capacitors connected to the transmitting unit 230. When the capacitors are discharged to a level less than or equal to a predetermined value, they may be then connected to the power inputting unit 210. The predetermined value may be zero, for example.

The controller 240 may be configured to detect one or more capacitors charged to a level less than the predetermined value from among the multiple capacitors. The controller 240 may control the charge time for the detected capacitor to be charged by the power supply. For example, controlling the charge time may indicate controlling the detected capacitor to be connected to the power inputting unit 210.

In addition, the controller 240 may be configured to detect one or more capacitors charged to a level greater than or equal to the predetermined level from among multiple capacitors. For example, the controller 240 may control the transmission time for the power stored in the detected capacitor to be transmitted to the source resonator. Controlling the transmission time may indicate controlling the detected capacitor to be connected to the transmitting unit 230.

The controller 240 may control the charge time and continuously charge the multiple capacitors until one or more of the capacitors are charged to a level greater than or equal to a predetermined level. Also, the controller 240 may control the charge time and preferentially charge one or more capacitors among the multiple capacitors so as to charge them.

The controller 240 may control the transmission time until the power of the multiple capacitors connected to the source resonator decreases to a level less than the predetermined value due to the wireless power transmission. For example, the controller 240 may control the transmission time for the capacitors to be connected to the source resonator for discharging. And the switching unit 220 may control switches so that the capacitors are connected to the source resonator based on the transmission time.

When the power of one or more charged capacitors decreases to a level less than or equal to the predetermined value, the controller 240 may be configured to control the charge time for those capacitors to be charged by the power supply to bring them power back up to the predetermined value (i.e., recharge them). Moreover, the controller 240 may be configured to control the charge time for the discharged capacitors to be charged by the power supply and the switching unit 220 may control switches so that the discharged capacitors are connected to the power supply.

In the wireless power transmitter, the power inputting unit 210 and the transmitting unit 230 may be electrically separated from each other by the switching unit 220, and the one or more capacitors arranged in parallel may be used. The power inputting unit 210 may be configured to charge the one or more capacitors connected to the inputting unit 210, and the transmitting unit 230 may transmit the power stored in the capacitors wirelessly using resonance. Because the power inputting unit 210 and the transmitting unit 230 are electrically separated, a change in operation environment of the wireless power transmitter should not adversely affect them. Accordingly, the power inputting unit 210 may use the one or more capacitors to provide sufficient for a target device without using a power amplifier.

Figure 3:
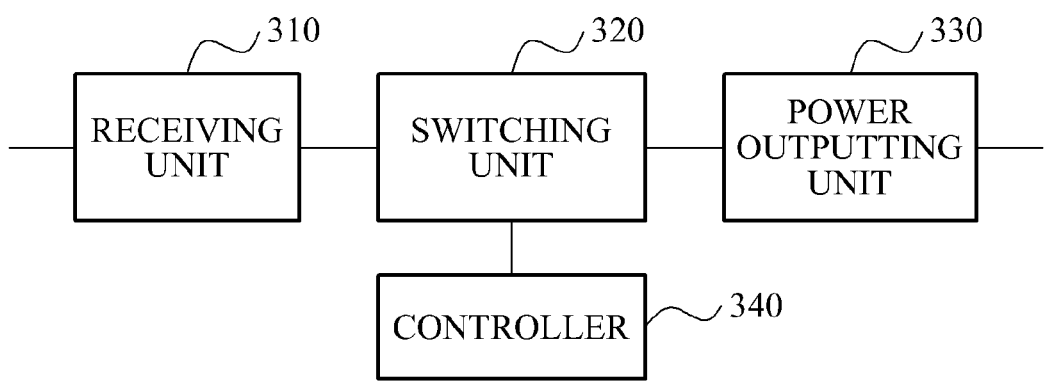
FIG. 3 is a block diagram illustrating a wireless power receiver.

FIG. 3 illustrates a wireless power receiver.

As shown in FIG. 3, the wireless power receiver may include a receiving unit 310, a switching unit 320, a power outputting unit 330, and a controller 340.

The receiving unit 310 may be configured to receive power wirelessly using resonance and charge one or more capacitors. If multiple capacitors are included, they may be arranged in a parallel manner. Although, it will be appreciated that the capacitors can also be arranged in a serial manner, or even in a combination parallel and serial arrangement.

The switching unit 320 may be configured to control switches corresponding to the one or more capacitors, respectively, based on a charge time for charging the capacitors and/or a transmission time for transmitting the power stored in the one or more capacitors to a target device.

The switching unit 320 may include one or more switches (or switching elements) corresponding to one or more capacitors, respectively and be configured to individually control the switch for each capacitor. The switches or switch elements may include similar elements as switching unit 220 (FIG. 2). In various embodiments, the switch may be configured to select between ON and OFF positions, which permit and prevent the flow of electricity (power), respectively. Accordingly the switches control electrical connection to and/or from one or more capacitors, thus enabling charging and discharging thereof. For instance, the switching unit may be configured, for example, to selectively (i) charge the one or more capacitors, and (ii) discharge power from the charged one or more capacitors. The switching unit may be controlled by a controller.

In one embodiment of the wireless power receiver, the switching unit 320 may be configured to control electrical connection of one or more capacitors to the receiving unit 310 and/or to the power outputting unit 330. For example, in response to controller 340, the switching unit 320 may be configured to selectably switch electrical connection of one or more capacitors between the receiving unit 310 and to the power outputting unit 330.

During the charge time, the switching unit 320 may connect one or more capacitor to be charged to the receiving unit 310. The capacitor(s) to be charged may be connected to the receiving unit 310 by an ON/OFF operation of a switch, for example. And the capacitor(s) to be charged may be separated from the power outputting unit 330, while it is connected to the receiving unit 310. Therefore, the receiving unit 310 and the power outputting unit 330 may be electrically separated from each other by a switching operation of the switching unit 320.

Transmitting the power stored in the charged capacitors to the target device may be performed by connecting them to the target device. During the transmitting time, the switching unit 320 may electrically connect the charged capacitors to the power outputting unit 330. The charged capacitors may be electrically connected to the power outputting unit 330, and the receiving unit 310 may be electrically separated (or isolated) from the power outputting unit 330.

In some embodiments, the charge time may be determined based on a time expended for charging a capacitor to a level greater than or equal to a predetermined level. The charge time may be also determined based on an amount of resonance power transmitted by the source resonator or an amount of power received by the target resonator and used for charging the capacitor. The transmission time may be determined based on an amount of power transmitted to the target device. For example, the transmission time, which may be the same as a discharge time, may be determined based on a rate of discharge of the power stored in a capacitor.

In some embodiments, the switching unit 320 may be configured to control switches to have a waiting time between the charge time and the transmission time, with respect to each capacitor. If the charge time and the transmission time overlap with each other, the receiving unit 310 and the power outputting unit 330 may be physically and electrically connected. On the other hand, when the receiving unit 310 and the power outputting unit 330 are physically and electrically connected, a factor deteriorating performance (such as impedance mismatching or the like) may be generated. Therefore, the switching unit 320 may be configured to control one or more switches so that the transmission time begins a predetermined time after the charge time. In some instances, the switching unit 320 may be configured to control one or more switches to alternate the charge time and the transmission time thereof.

The power outputting unit 330 may be configured to transmit power stored in the capacitors to the target device or may include the target device. The capacitors charged by the receiving unit 310 may be connected to the target device through the switching unit 320. For example, the power outputting unit 330 may transmit the power stored in the capacitors to the target device.

The controller 340 may be configured to sense the power stored in the capacitors and may control the charge time and the transmission time. The controller 340 may sense the power stored in the capacitors connected to the receiving unit 310. And, when a capacitor is charged to a level greater than or equal to a predetermined level, it may then be connected to the power outputting unit 330. For example, the predetermined level may be a maximum charging level of a capacitor. Whether a capacitor is charged to a maximum charging level may be determined based on whether a first order differentiation of the stored power is at or close to zero. When a difference between the currently stored power and the stored power of a previous sampling time is less than a given value, it may be determined or assumed that the capacitor is charged to the maximum charging level.

In addition, the controller 340 may be configured to sense the power stored in a capacitor connected to the power outputting unit 330. When the capacitor is discharged to a level less than a predetermined value, it may then be connected to the receiving unit 310. For example, the predetermined value may be zero. And when the stored power is at or near zero, the controller 340 may control the charge time for the capacitor to be charged to a level greater than or equal to the predetermined level. For example, controlling the charge time may indicate to the receiving unit 310 that the power stored in the capacitor is at or near zero. The switching unit 320 may control a switch to connect a discharged capacitor to the receiving unit 310 based on the charge time.

The controller 340 may also control the transmission time to transmit the power stored in the capacitor charged to the level greater than or equal to the predetermined level to the target device. For example, controlling the transmission time may indicate to the power outputting unit 330 whether the capacitor is charged to the level greater than or equal to the predetermined level. The switching unit 320 may control a switch to connect the charged capacitor to the target device based on the transmission time.

When a capacitor is discharged due to transmission of the power to the target device, the controller 340 may control the charge time to charge it with the received resonance power.

In the wireless power receiver, the receiving unit 310 and the power outputting unit 330 may be electrically separated from each other by the switching unit 320. One or more capacitors may be positioned between the receiving unit 310 and the power outputting unit 330 and connected to each by the switching unit 320. As such, the receiving unit 310 may charge the one or more capacitors connected to it. And the power outputting unit 330 may be configured to transmit, to the target device, the power stored in the one or more capacitors. Because the receiving unit 310 and the power outputting unit 330 are electrically separated, a change in operation environment of the wireless power transmitter ordinarily should not adversely affect them. The receiving unit 310 may use one or more capacitors to transmit sufficient power to the target device without using a rectifier.

Figure 4:
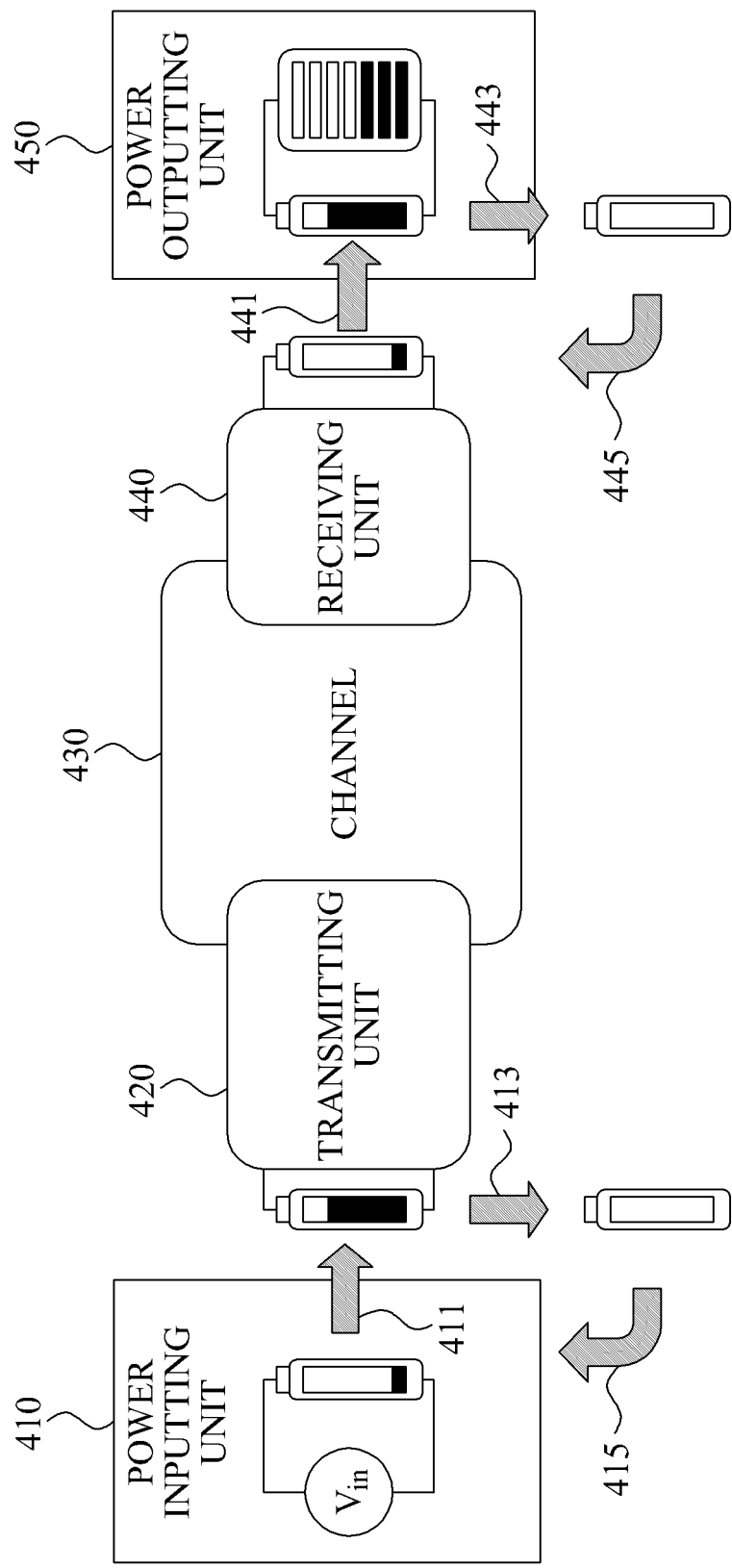
FIG. 4 is a block diagram illustrating a wireless power transmission system.

FIG. 4 illustrates a wireless power transmission system.

As shown in FIG. 4, in the wireless power transmission system, a power inputting unit 410 and a transmitting unit 420 are physically and electrically separated from each other, and a receiving unit 440 and a power outputting unit 450 are physically and electrically separated from each other.

The power inputting unit 410 may include a power source $V_{in}$ and multiple capacitors arranged in parallel. In FIG. 4, the capacitor is depicted having a shape similar to that of a battery. The power inputting unit 410 may charge the multiple capacitors using the power source $V_{in}$. The charged capacitors may be connected to the transmitting unit 420 by a switching operation 411. The transmitting unit 420 may be configured to transmit the power stored in the capacitors through a source resonator. As indicated by reference numeral 413, the capacitors connected to the transmitting unit 420 may be discharged as the source resonator transmits resonance power through magnetic coupling with a target resonator. The discharged capacitors may be connected to the power inputting unit 410 through the switching operation 415.

Resonance power transmitted from the transmitting unit 420 through the source resonator may be received by a target resonator of the receiving unit 440. For example, the source resonator and the target resonator may transmit and receive resonance power through a predetermined channel 430. The predetermined channel 430 may include an operating frequency band between the source resonator and the target resonator. The receiving unit 440 may include one or more capacitors indicated in FIG. 4 having a shape similar to that of a battery, and they may be charged with the received resonance power. The charged capacitor may be connected to the power outputting unit 450 by a switching operation 441. Accordingly, the power outputting unit 450 may be configured to transmit, to a target device, the power stored in the capacitor connected to the power outputting unit 450. As the power is transmitted to the target device, the capacitor is discharged as indicated by the reference numeral 443. A discharged capacitor may be connected to the receiving unit 440 by a switching operation 445.

The power inputting unit 410 and the transmitting unit 420 may be electrically separated from each other. The receiving unit 440 and the power outputting unit 450 may be electrically separated from each other. In other words, the source resonator and the power source $V_{in}$ may be electrically separated (or isolated) from each other, and the target resonator and the target device may be electrically separated (or isolated) from each other. Thus, frequency matching and impedance matching based on a change in operation environment may not need to be performed. The power to be transmitted from the source resonator may be determined based on the power stored in the multiple capacitors connected to the transmitting unit 420, and the power transmitted to the target device may be determined based on the power stored in one or more capacitors connected to the power outputting unit 450. Accordingly, the transmission efficiency may be determined based on charging of a capacitor and transmission of power stored in the capacitor, regardless of the change in operation environment.

Figure 5:
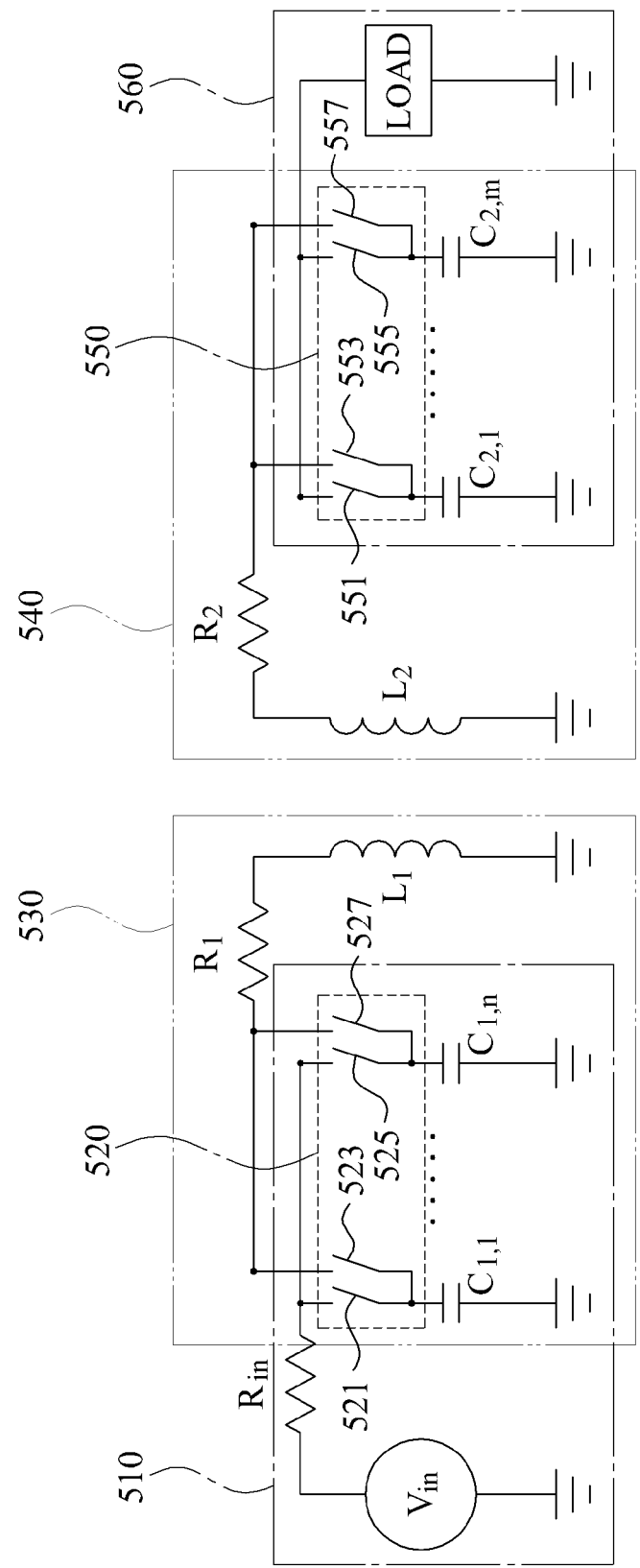
FIG. 5 is a diagram illustrating an equivalent circuit of a wireless power transmission system.

FIG. 5 illustrates an equivalent circuit for a wireless power transmission system.

As shown in FIG. 5, the wireless power transmission system may include a power inputting unit 510, a first switching unit 520, a transmitting unit 530, a receiving unit 540, a second switching unit 550, and a power outputting unit 560.

The power inputting unit 510 may receive power from a power supply, or include a power supply, to charge multiple capacitors arranged in parallel. The first switching unit 520 may be configured to control a plurality of first switches based on a first charge time for charging multiple capacitors and a first transmission time for transmitting the power stored in the multiple capacitors to the transmitting unit 530. The transmitting unit 530 may transmit, through a magnetic coupling, resonance power to the receiving unit 540. The receiving unit 540 may receive the resonance power to charge one or more capacitors. The second switching unit 550 may control a plurality of second switches based on a second charge time for charging the one or more capacitors and a second transmission time for transmitting the power stored in the one or more capacitors to a target device LOAD. The power outputting unit 560 may be configured to transmit the power stored in the one or more capacitors to the target device LOAD or may include the target device LOAD. The target device may include a power consuming element or a power saving element such as, for example, a battery.

The power inputting unit 510 may include a power source $V_{in}$, an internal resistance $R_{in}$, and multiple capacitors $C_{1,1}, \ldots, C_{1,n}$ arranged in parallel. The power inputting unit 510 may charge the multiple capacitors with power supplied from the power source $V_{in}$. For example, the multiple capacitors $C_{1,1}, \ldots, C_{1,n}$ may be connected to the power inputting unit 510 through the first switching unit 520. When switches 521 and 525 are in an "ON" position in the first switching unit 520, the multiple capacitors $C_{1,1}, \ldots, C_{1,n}$ may be connected to the power inputting unit 510. The switches 521 and 525 may be in an "ON" position together or may be in an "ON" position separately.

The transmitting unit 530 may include a source resonator having basic circuit elements L1 and R1, and the multiple capacitors $C_{1,1}, \ldots, C_{1,n}$. In other words, the basic circuit elements L1 and R1 together with the multiple capacitors form a wireless power transmission circuit. The multiple capacitors $C_{1,1}, \ldots, C_{1,n}$ charged by the power inputting unit 510 may be connected to the transmitting unit 530 through the first switching unit 520. When a switch 523 and a switch 527 are in an "ON" position in the first switching unit 520, the charged multiple capacitors $C_{1,1}, \ldots, C_{1,n}$ may be connected to the transmitting unit 530. For example, when the capacitor $C_{1,1}$ is connected to the power inputting unit 510, the capacitor $C_{1,1}$ may not be simultaneously connected to the transmitting unit 530. Similarly, when the capacitor $C_{1,n}$ is connected to the power inputting unit 510, the capacitor $C_{1,n}$ may not be simultaneously connected to the transmitting unit 530. Therefore, the first switching unit 520 may switch to an "ON" position the switch 521 and the switch 523 at regular intervals. The transmitting unit 530 may transmit the power stored in the multiple capacitors connected to it. For example, the power may be transmitted wirelessly using resonance.

The receiving unit 540 may include a target resonator having basic circuit elements L2 and R2 and capacitors $C_{2,1}, \ldots, C_{2,m}$. In other words, the basic circuit elements L2 and R2 together with the capacitors $C_{2,1}, \ldots, C_{2,m}$ form a wireless power reception circuit. While FIG. 5 illustrates multiple capacitors $C_{2,1}, \ldots, C_{2,m}$, a single capacitor may also be used instead. The receiving unit 540 may charge the capacitors $C_{2,1}, \ldots, C_{2,m}$ with the resonance power received from the transmitting unit 530. For example, the capacitors $C_{2,1}, \ldots, C_{2,m}$ may be connected to the receiving unit 540 by the second switching unit 550. When a switch 553 and a switch 557 are in an "ON" position in the second switching unit 550, the capacitors $C_{2,1}, \ldots, C_{2,m}$ may be connected to the receiving unit 540. The switch 553 and the switch 557 may be in an "ON" position together or may be in an "ON" position separately.

The power outputting unit 560 may include a target device LOAD. The capacitors $C_{2,1}, \ldots, C_{2,m}$ charged by the receiving unit 540 may be connected to the power outputting unit 530 by the second switching unit 550. When a switch 551 and a switch 555 are in an "ON" position in the second switching unit 550, the capacitors $C_{2,1}, \ldots, C_{2,m}$ may be connected to the power outputting unit 560. For example, when the capacitor $C_{2,1}$ is connected to the receiving unit 540, the capacitor $C_{2,1}$ may not be simultaneously connected to the power outputting unit 560. Similarly, when the capacitor $C_{2,m}$ is connected to the receiving unit 540, the capacitor $C_{2,m}$ may not be simultaneously connected to the power outputting unit 560. Therefore, the second switching unit 550 may switch to an "ON" position the switch 551 and the switch 553 at regular intervals. The power outputting unit 560 may include or transmit to the target device LOAD the power stored in the capacitors $C_{2,1}, \ldots, C_{2,m}$.

The first switching unit 520 may control the switches 525 and 527 to prevent the first charge time and the first transmission time from overlapping with each other, with respect to each capacitor $C_{1,n}$. If the first charge time and the first transmission time overlap with each other, the power inputting unit 510 and the transmitting unit 530 are physically and electrically connected and thus, mismatching may occur.

The second switching unit 550 may control second switches 555 and 557 to prevent the second charge time and the second transmission time from overlapping with each other, with respect to each capacitor $C_{2,m}$.

In some embodiments, the first switching unit 520 and the second switching unit 550 may be asynchronous, and may control the switch 523 and the switch 527, and the switch 553 and the switch 557 based on the first transmission time and the second charge time, respectively. The transmitting unit 530 merely transmits the resonance power and the receiving unit 540 merely receives the resonance power and thus, the switch 553 and the switch 557 may not be synchronously on in the receiving unit 540 when the switch 523 and the switch 527 are ON in the transmitting unit 530. In other embodiments, though, switching may be synchronous.

Figure 6:
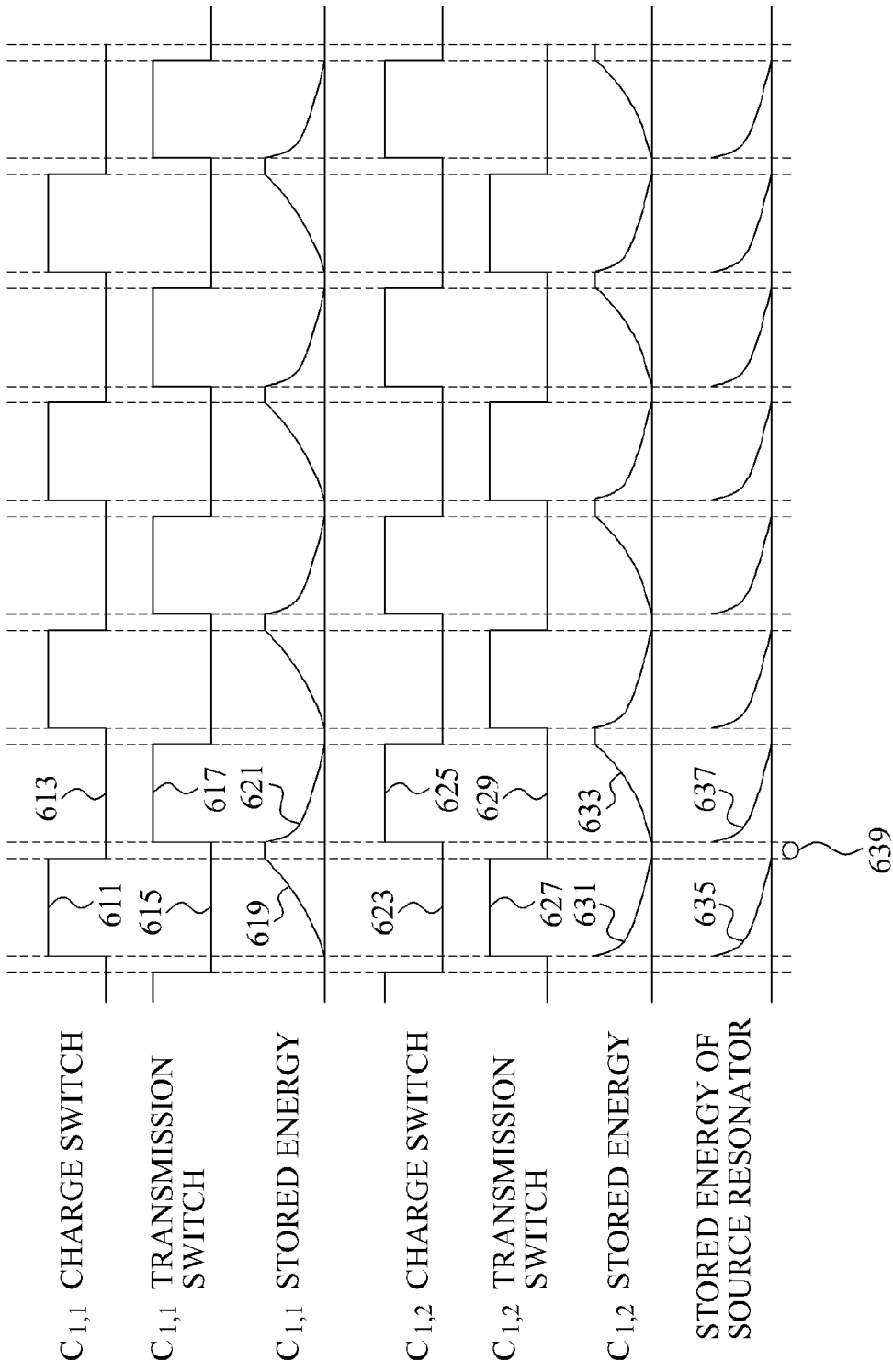
FIG. 6 is a diagram illustrating an operation of a switch and stored energy when two capacitors arranged in parallel are included in a wireless power transmitter.

FIG. 6 illustrates an operation of a switch and stored energy when two capacitors arranged in parallel are included in the wireless power transmitter of FIG. 5.

The wireless power transmitter of FIG. 5 may include two capacitors $C_{1,1}$ and $C_{1,2}$ connected to the power inputting unit 510 or the transmitting unit 530. As shown in FIG. 6, a charge switch denotes a switch for connection to the power inputting unit 510 and a transmission switch denotes a switch for connection to the transmitting unit 530.

When a charge switch of a capacitor $C_{1,1}$ operates in a period 611, a transmission switch of the capacitor $C_{1,1}$ does not operate in a period 615. Therefore, a charge time and a transmission time associated with the capacitor $C_{1,1}$ do not overlap with each other. When the charge switch of the capacitor $C_{1,1}$ does not operate in a period 613, the transmission switch of the capacitor $C_{1,1}$ operates in a period 617. And when the charge switch of the capacitor $C_{1,1}$ operates in the period 611, the capacitor $C_{1,1}$ may be charged by a power source in a period 619. Once the energy stored in the capacitor $C_{1,1}$ reaches a predetermined level, the transmission switch of the capacitor $C_{1,1}$ may operate. When the transmission switch of the capacitor $C_{1,1}$ operates in the period 617, the power stored in the charged capacitor $C_{1,1}$ may be transmitted to a source resonator, and the capacitor $C_{1,1}$ may be discharged in a period 621. When the capacitor $C_{1,1}$ is discharged and the stored energy decreases to be less than or equal to a predetermined value, the charge switch of the capacitor $C_{1,1}$ may operate again.

The capacitor $C_{1,2}$ and the capacitor $C_{1,1}$ may be alternately charged and discharged, to continuously transmit power to the source resonator, for example. When a charge switch of the capacitor $C_{1,2}$ does not operate in a period 623, a transmission switch of the capacitor $C_{1,2}$ operates in a period 627. When the charge switch of the capacitor $C_{1,2}$ operates in a period 625, the transmission switch of the capacitor $C_{1,2}$ does not operate in a period 629. When the charge switch of the capacitor $C_{1,2}$ operates in a period 625, the capacitor $C_{1,2}$ may be charged by a power source in a period of 633. When the energy stored in the capacitor $C_{1,2}$ reaches a predetermined level, the transmission switch of the capacitor $C_{1,2}$ may operate. When the transmission switch of the capacitor $C_{1,2}$ operates in a period 627, the power stored in the capacitor $C_{1,2}$ may be transmitted to the source resonator, and the capacitor $C_{1,2}$ may be discharged in a period 631. When the capacitor $C_{1,2}$ is discharged and the stored energy decreases to be less than or equal to a predetermined value, the charge switch of the capacitor $C_{1,2}$ may operate again. Power may be continuously transmitted to the source resonator by repeatedly performing the above described operations. As such, the source resonator may continuously receive energy from the capacitor $C_{1,1}$ and the capacitor $C_{1,2}$ in periods 635 and 637. In some embodiments, a waiting time 639 may be inserted between a charge time and a transmission time for the same capacitor, to prevent the charge time and the transmission time from overlapping with each other.

Figure 7:
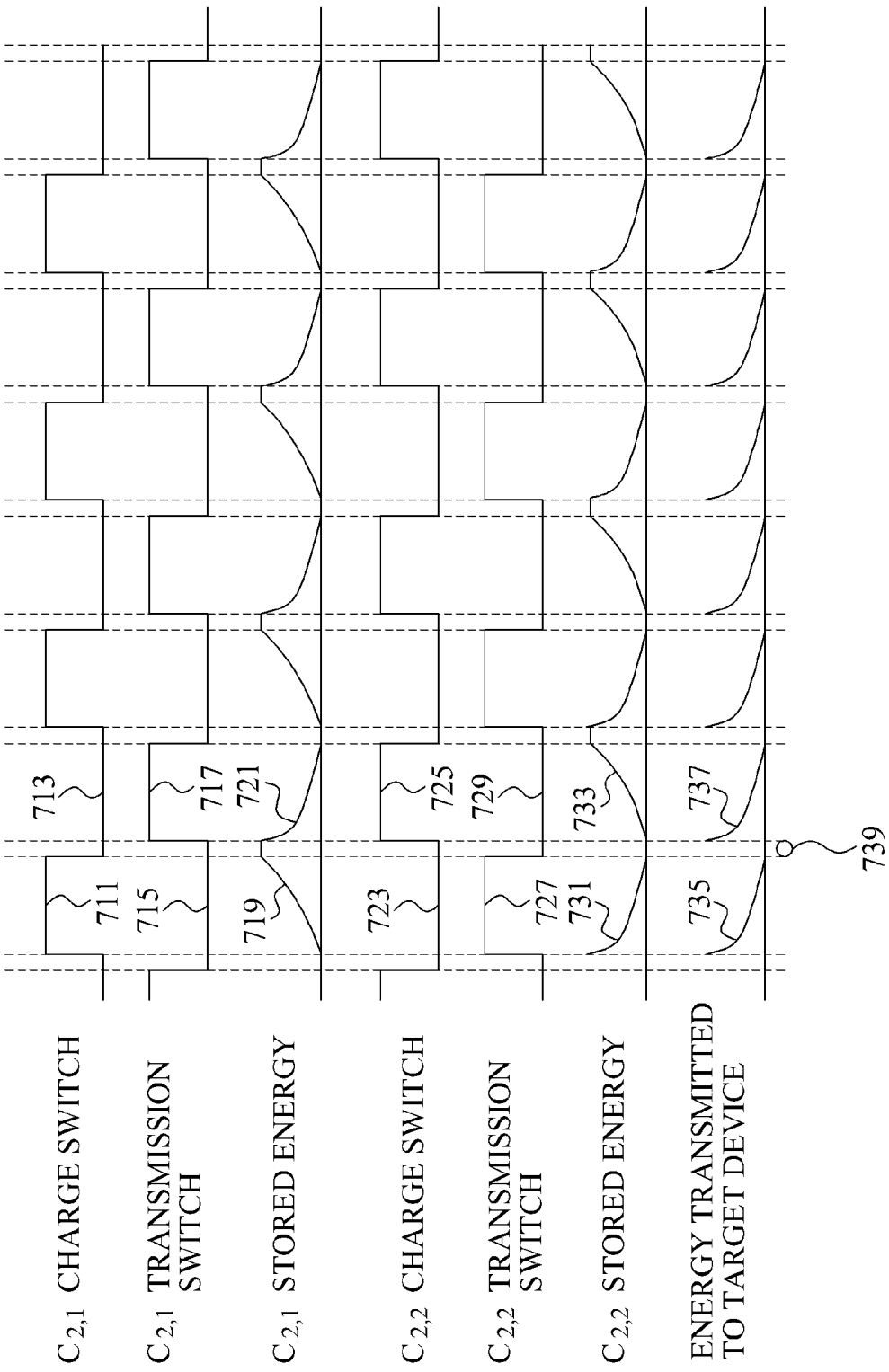
FIG. 7 is a diagram illustrating an operation of a switch and stored energy when two capacitors arranged in parallel are included in a wireless power receiver.

FIG. 7 illustrates an operation of a switch and stored energy when two capacitors arranged in parallel are included in the wireless power receiver of FIG. 5.

The wireless power receiver of FIG. 5 may include two capacitors $C_{2,1}$ and $C_{2,2}$ connected to the receiving unit 540 or the power outputting unit 560. As shown in FIG. 7, a charge switch denotes a switch for connection to the receiving unit 540 and a transmission switch denotes a switch for connection to the power outputting unit 560.

When a charge switch of the capacitor $C_{2,1}$ operates in a period 711, a transmission switch of the capacitor $C_{2,1}$ does not operate in a period 715. Therefore, a charge time and a transmission time associated with the same capacitor do not overlap with each other. When the charge switch of the capacitor $C_{2,1}$ does not operate in a period 713, the transmission switch of the capacitor $C_{2,1}$ operates in a period 717. When the charge switch of the capacitor $C_{2,1}$ operates in the period 711, the capacitor $C_{2,1}$ may be charged with the resonance power received through a target resonator in a period 719. When the energy stored in the capacitor $C_{2,1}$ reaches a predetermined level, the transmission switch of the capacitor $C_{2,1}$ may operate. When the transmission switch of the capacitor $C_{2,1}$ operates in the period 717, the power stored in the charged capacitor $C_{2,1}$ may be transmitted to a target device, and the capacitor $C_{2,1}$ may be discharged in the period 721. When the capacitor $C_{2,1}$ is discharged and the stored energy decreases to be less than or equal to a predetermined value, the charge switch of the capacitor $C_{2,1}$ may operate again.

The capacitor $C_{2,1}$ and the capacitor $C_{2,2}$ may be alternately charged and discharged, to continuously transmit power to the target device, for example. When a charge switch of the capacitor $C_{2,2}$ does not operate in a period 723, a transmission switch of the capacitor $C_{2,2}$ operates in a period 727. When the charge switch of the capacitor $C_{2,2}$ operates in a period 725, the transmission switch of the capacitor $C_{2,2}$ does not operate in a period 729. When the charge switch of the capacitor $C_{2,2}$ operates in a period 725, the capacitor $C_{2,2}$ may be charged with the resonance power received through the target resonator in a period 733. Once the energy stored in the capacitor $C_{2,2}$ reaches a predetermined level, the transmission switch of the capacitor $C_{2,2}$ may operate. When the transmission switch of the capacitor $C_{2,2}$ operates in a period 727, the power stored in the capacitor $C_{2,2}$ may be transmitted to the target device, and the capacitor $C_{2,2}$ may be discharged in a period 731. When the capacitor $C_{2,2}$ is discharged and the stored energy decreases to be less than or equal to a predetermined value, the charge switch of the capacitor $C_{2,2}$ may operate again. Power may be continuously transmitted to the target device by repeatedly performing the above described operations. The target device may continuously receive energy from the capacitor $C_{2,1}$ and the capacitor $C_{2,2}$ in periods 735 and 737. In some embodiments, a waiting time 739 may be inserted between a charge time and a transmission time for the same capacitor, to prevent the charge time and the transmission time from overlapping with each other.

Figure 8:
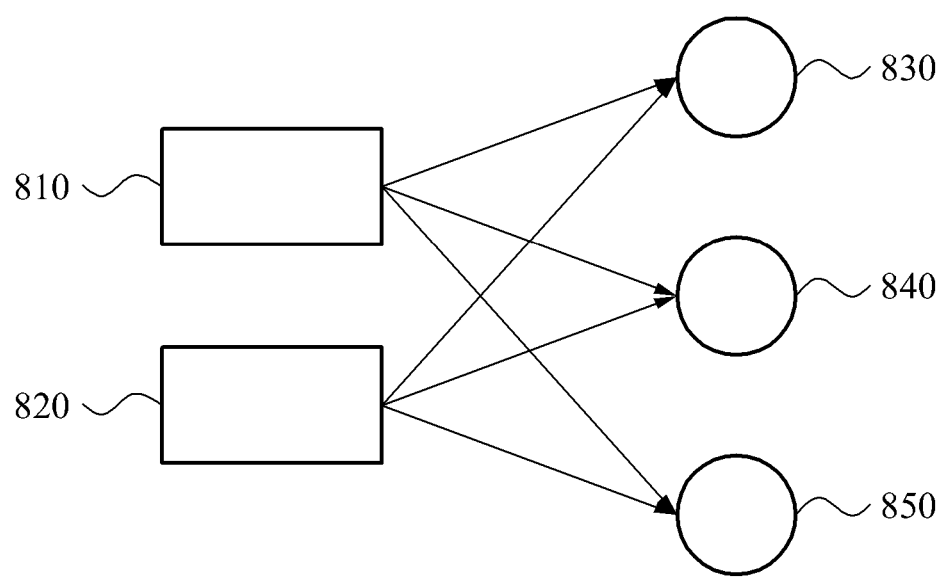
FIG. 8 is a diagram illustrating resonance power transmission between multiple wireless power transmitters and multiple wireless power receivers.

FIG. 8 illustrates resonance power transmission between multiple wireless power transmitters and multiple wireless power receivers.

As described, above, with respect to FIGS. 6 and 7, a wireless power transmitter and a wireless power receiver may separately determine a charge time and a transmission time. For example, the wireless power transmitter may determine the charge time and the transmission time to increase transmission efficiency. And the wireless power receiver may determine the charge time and the transmission time to increase reception efficiency. Therefore, even when the wireless power transmitter and the wireless power receiver are separately controlled, the transmission efficiency may be maintained.

In FIG. 8, two wireless power transmitters 810 and 820 and three wireless power receivers 830, 840, and 850 are shown. The wireless power transmitter 810 may transmit resonance power to the three wireless power receivers 830, 840, and 850. For example, the wireless power transmitter 810 may be optimized to charge multiple capacitors in a short time and to transmit the resonance power through a source resonator. Each of the three wireless power receivers 830, 840, and 850 may be optimized or otherwise configured to charge one or more capacitors with the received resonance power in a short time and to transmit power to a target device. Therefore, the transmission efficiency may be maintained regardless of a change in operation environment (such as, for example, a distance and a change of a target device). The wireless power transmitter 820 may also transmit resonance power to the three wireless power receivers 830, 840, and 850, while maintaining transmission efficiency.

Figure 9:
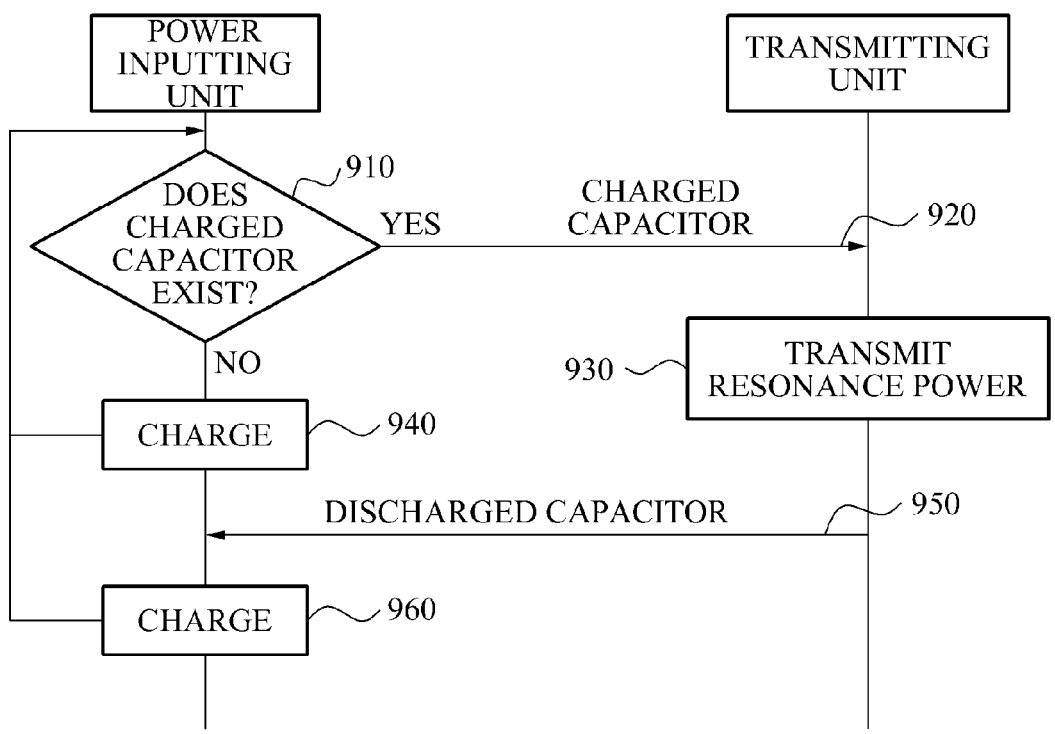
FIG. 9 is a flowchart illustrating a wireless power transmission method.

FIG. 9 illustrates a wireless power transmission method.

The wireless power transmitter may determine whether a charged capacitor exists from among multiple capacitors that are connected to a power inputting unit in operation 910. When a charged capacitor is determined, it may be connected to a transmitting unit through a switching operation in operation 920. The transmitting unit may transmit the power received from the charged capacitor through a source resonator in operation 930. However, when one or more capacitors are not fully charged, the power inputting unit may charge the one or more capacitors connected to the power inputting unit in operation 940. And when a charged capacitor becomes discharged (e.g., due to the resonance power transmission), the discharged capacitor may be connected again to the power inputting unit through a switching operation in operation 950. The discharged capacitor connected to the power inputting unit may be charged in operation 960. Power may be continuously transmitted to the source resonator by repeatedly performing the described operations (as necessary). Capacitors may be fully or partial discharges depending on power needs.

Figure 10:
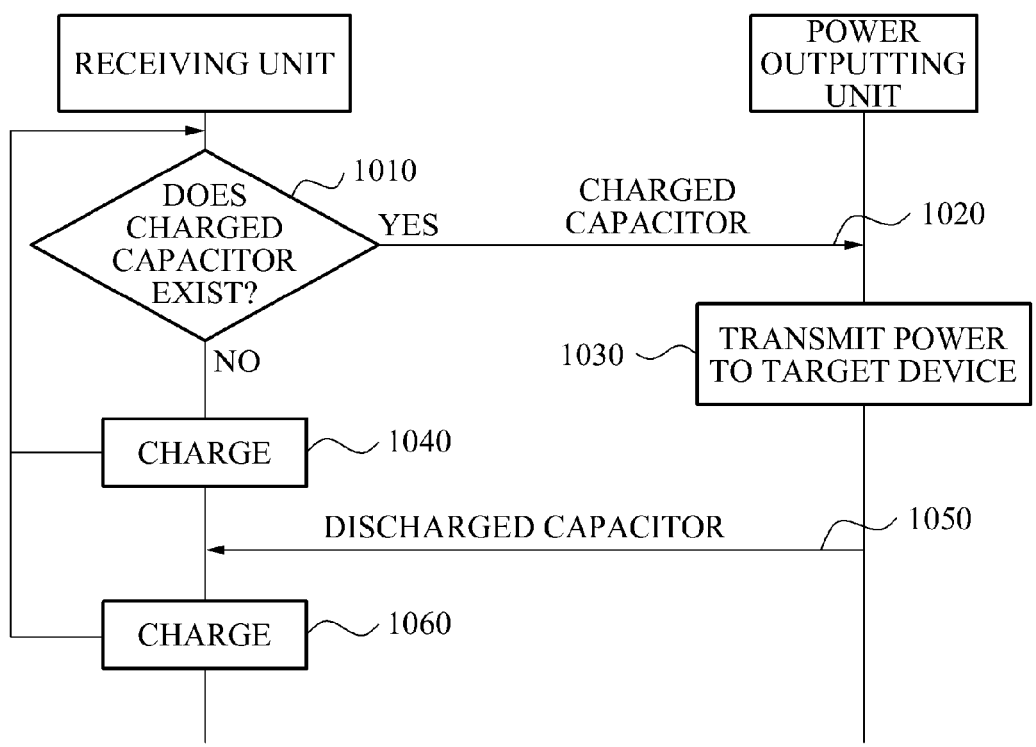
FIG. 10 is a flowchart illustrating a wireless power reception method.

FIG. 10 illustrates a wireless power reception method.

The wireless power receiver determines whether a charged capacitor exists from among one or more capacitors that are connected to a receiving unit in operation 1010. If a charged capacitor is determined, it may be connected to a power outputting unit through a switching operation in operation 1020. The power outputting unit may transmit the power received from the charged capacitor to a target device in operation 1030. On the other hand, if a capacitor is not charged, the receiving unit may charge the capacitor connected to the receiving unit in operation 1040. The charged capacitor may then be discharged by transmitting the power to the target device and thus, the charged capacitor may be connected to the receiving unit again through switching in operation 1050. The discharged capacitor connected to the receiving unit may be charged in operation 1060. Power may be continuously transmitted to the target device by repeatedly performing the described operations (as necessary). Capacitors may be fully or partial discharges depending on power needs.

One or more of the above-described embodiments may be recorded in non-transitory computer-readable media including program instructions to implement various operations embodied by a computer or computing device having one or more processors. The media may also include, alone or in combination with the program instructions, data files, data structures, and/or the like. Examples of non-transitory computer-readable media may include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and/or the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
   a capacitor;
   a power inputting unit configured to charge the capacitor;
   a transmitting unit configured to transmit resonance power; and
   a switching unit configured to connect the capacitor to the power inputting unit and to the transmitting unit.

2. The wireless power transmitter of claim 1, wherein the power inputting unit comprises a DC power supply or an AC power supply configured to charge the capacitor.

3. The wireless power transmitter of claim 1, wherein the switching unit is configured to connect the capacitor to only the power inputting unit or only the transmitting unit.

4. The wireless power transmitter of claim 1, wherein the switching unit comprises a switch configured to connect the capacitor between the power inputting unit and the transmitting unit.

5. The wireless power transmitter of claim 1, further comprising:
   a controller configured to
      sense power stored in the capacitor, and
      control the switching unit to connect the capacitor to the power inputting unit during a charge time, and control the switching unit to connect the capacitor to the transmitting unit during a transmission time, based on the sensed power.

6. The wireless power transmitter of claim 5, wherein the controller is configured to control the switching unit to connect the capacitor to the transmitting unit until the capacitor is discharged to a level less than a predetermined level.

7. The wireless power transmitter of claim 5, wherein the controller is configured to control the switching unit to connect the capacitor to the power inputting unit until the capacitor is charged to a level greater than or equal to a predetermined level.

8. A wireless power receiver comprising:
a capacitor;
a receiving unit configured to receive resonance power, and charge the capacitor;
a power outputting unit configured to transmit power to a target device; and
a switching unit configured to connect the capacitor to the receiving unit and to the power outputting unit.

9. The wireless power receiver of claim 8, wherein the switching unit is configured to connect the capacitor to only the receiving unit or only the power outputting unit.

10. The wireless power receiver of claim 8, wherein the target device comprises a battery.

11. The wireless power receiver of claim 8, further comprising:
a controller configured to
sense power stored in the capacitor, and
control the switching unit to connect the capacitor to the receiving unit during a charge time, and control the switching unit to connect the capacitor to the power outputting unit during a transmission time, based on the sensed power.

12. The wireless power receiver of claim 11, wherein the controller is configured to
control the switching unit to connect the capacitor to the receiving unit during the charge time after a waiting time between the charge time and the transmission time; and
control the switching unit to connect the capacitor to the power outputting unit during the transmission time after the waiting time.

13. The wireless power receiver of claim 11, wherein the controller is configured to control the switching unit to connect the capacitor to the receiving unit until the capacitor is charged to a level greater than or equal to a predetermined level.

14. The wireless power receiver of claim 11, wherein, the controller is configured to control the switching unit to connect the capacitor to the power outputting unit until the capacitor is discharged to a level less than a predetermined level.

15. A wireless power transmitter comprising:
a capacitor;
a power inputting unit configured to be connected to the capacitor for a first period to charge the capacitor; and
a transmitting unit configured to be connected to the capacitor for a second period to transmit resonance power.

16. The wireless power transmitter of claim 15, wherein the first period does not overlap with the second period.

17. The wireless power transmitter of claim 15, wherein the first and second periods are fixed.

18. The wireless power transmitter of claim 15, wherein the first and second periods are variable.

19. The wireless power transmitter of claim 15, wherein the power inputting unit comprises an AC power supply.

20. The wireless power transmitter of claim 15, further comprising:
another capacitor arranged in parallel to the capacitor,
wherein the power inputting unit is further configured to be connected to the other capacitor for the second period to charge the other capacitor, and
wherein the transmitting unit is further configured to be connected to the other capacitor for the first period to transmit resonance power.

21. A wireless power receiver comprising:
a capacitor;
a receiving unit configured to be connected to the capacitor for a first period to receive resonance power and to charge the capacitor; and
a power outputting unit configured to be connected to the capacitor for a second period to transmit power to a target device.

22. The wireless power receiver of claim 21, wherein the target device comprises a battery.

23. The wireless power receiver of claim 21, further comprising:
another capacitor arranged in parallel to the capacitor,
wherein the receiving unit is further configured to be connected to the other capacitor for the second period to receive resonance power and to charge the other capacitor, and
wherein the power outputting unit is further configured to be connected to the other capacitor for the first period to transmit power to the target device.

24. The wireless power receiver of claim 21, wherein the first and second periods are fixed.

25. The wireless power receiver of claim 21, wherein the first and second periods are variable.

26. The wireless power receiver of claim 21, wherein the first period does not overlap with the second period.

* * * * *